US009574881B2

(12) United States Patent
Yu et al.

(10) Patent No.: US 9,574,881 B2
(45) Date of Patent: Feb. 21, 2017

(54) METHOD AND SYSTEM FOR CONTROLLING ANTENNA OF MOBILE COMMUNICATION APPLICATION SYSTEM BASED ON DOUBLE QUATERNIONS IN MEMS INERTIAL NAVIGATION

(71) Applicant: BEIJING AEROSPACE WANDA HI-TECH LTD., Beijing (CN)

(72) Inventors: Qingbo Yu, Bejing (CN); Jizhuo Men, Beijing (CN); Shulun Zhao, Beijing (CN); Rong Lang, Beijing (CN); Xiaobin Liu, Beijing (CN); Chunxiang Yang, Beijing (CN)

(73) Assignee: BEIJING AEROSPACE WANDA HI-TECH LTD., Beijing (CN)

( * ) Notice: Subject to any disclaimer, the term of this patent is extended or adjusted under 35 U.S.C. 154(b) by 0 days.

(21) Appl. No.: 15/108,778

(22) PCT Filed: Jun. 30, 2014

(86) PCT No.: PCT/CN2014/081165
§ 371 (c)(1),
(2) Date: Jun. 28, 2016

(87) PCT Pub. No.: WO2015/188409
PCT Pub. Date: Dec. 17, 2015

(65) Prior Publication Data
US 2016/0349058 A1     Dec. 1, 2016

(30) Foreign Application Priority Data

Jun. 13, 2014   (CN) .......................... 2014 1 0265808

(51) Int. Cl.
*B64G 1/36*     (2006.01)
*G05D 1/00*     (2006.01)
(Continued)

(52) U.S. Cl.
CPC ............. *G01C 21/18* (2013.01); *B64G 1/1014* (2013.01); *B64G 1/24* (2013.01); *H01Q 1/247* (2013.01); *H01Q 3/02* (2013.01)

(58) Field of Classification Search
CPC ........ H01Q 1/2266; H01Q 1/50; H01Q 21/28; H01Q 5/10; H01Q 9/0407; H01Q 9/045; H01Q 13/10; H01Q 13/18; H01Q 15/08; G01C 21/165; G01C 21/20; G01C 21/32; G01C 21/3611; G01C 21/3667; B64D 2045/0065; B64D 25/20; B64D 2700/62289; B64D 47/08; B64D 11/0624; B64G 1/00; B64G 1/10; B64G 1/24; B64G 1/44; B64G 1/425; B64G 1/428; B64G 1/007; B64G 1/66; B64G 1/22
(Continued)

(56) References Cited

U.S. PATENT DOCUMENTS 5,412,574 A * 5/1995 Bender .................... B64G 1/36
                                                          244/164
5,546,309 A * 8/1996 Johnson ................ G01S 3/7862
                                                          244/164
(Continued)

FOREIGN PATENT DOCUMENTS

| CN | 102608642 A | 7/2012 |
| CN | 102637954 A | 8/2012 |
| CN | 103746186 A | 4/2014 |

OTHER PUBLICATIONS

PCT International Search Report, PCT/CN2014/081165, Mar. 17, 2015, 4 Pages.
(Continued)

*Primary Examiner* — Calvin Cheung
*Assistant Examiner* — Luis A Martinez Borrero
(74) *Attorney, Agent, or Firm* — Fenwick & West LLP

(57) ABSTRACT

A method for controlling an antenna of a mobile communication application system based on double quaternions in MEMS inertial navigation. The method comprises: introducing an antenna control quaternion based on a navigation attitude quaternion; in each interrupt cycle of a navigation computer, updating the two quaternions respectively using a carrier system measured by a gyroscope relative to a rotation vector of an ideal platform coordinate system; in each filter cycle, correcting the error of the navigation attitude quaternion respectively using a Kalman filter; according to the relationship between the attitudes determined by the two attitude quaternions, determining the angular speed in an antenna control instruction; and finally, driving a servo system to rotate at an antenna servo control angle converted by an antenna control quaternion attitude.

4 Claims, 2 Drawing Sheets

(51) Int. Cl.

| | | |
|---|---|---|
| G05D 3/00 | (2006.01) | |
| G06F 7/00 | (2006.01) | |
| G06F 17/00 | (2006.01) | |
| G01C 21/18 | (2006.01) | |
| H01Q 3/02 | (2006.01) | |
| H01Q 1/24 | (2006.01) | |
| B64G 1/10 | (2006.01) | |
| B64G 1/24 | (2006.01) | |

(58) Field of Classification Search
USPC ..... 343/703, 720, 724, 745, 702; 455/426.1, 455/67.11, 115.1, 230, 404.1, 411; 701/3, 41, 701/469, 13, 23, 2, 24, 25, 301, 468, 470, 476, 701/502, 513, 9
See application file for complete search history.

(56) References Cited

U.S. PATENT DOCUMENTS

| | | | |
|---|---|---|---|
| 5,583,774 A | 12/1996 | Diesel | |
| 5,794,891 A * | 8/1998 | Polle | B64G 1/24 244/164 |
| 5,959,576 A * | 9/1999 | Ring | B64G 1/24 244/171 |
| 6,000,661 A * | 12/1999 | Price | B64G 1/24 244/164 |
| 6,145,790 A * | 11/2000 | Didinsky | B64G 1/288 244/164 |
| 6,211,822 B1 * | 4/2001 | Dougherty | G01S 19/28 342/357.36 |
| 6,237,876 B1 * | 5/2001 | Barker | B64G 1/007 244/158.6 |
| 6,523,786 B2 * | 2/2003 | Yoshikawa | B64G 1/361 244/171 |
| 6,595,469 B2 * | 7/2003 | Li | B64G 1/24 244/158.1 |
| 6,616,104 B1 * | 9/2003 | Cheng | B64G 1/1007 244/158.6 |
| 6,732,977 B1 * | 5/2004 | Goodzeit | B64G 1/28 244/164 |
| 6,859,727 B2 * | 2/2005 | Bye | G01C 21/165 701/510 |
| 7,357,356 B1 * | 4/2008 | Goodzeit | B64G 1/283 244/164 |
| 7,464,898 B1 * | 12/2008 | Goodzeit | B64G 1/26 244/164 |
| 7,904,243 B2 * | 3/2011 | Cohen | G01S 19/06 342/350 |
| 8,472,737 B2 * | 6/2013 | Rachlin | G06K 9/6211 382/235 |
| 8,930,047 B2 * | 1/2015 | Robinson | H01Q 1/125 342/359 |
| 9,045,239 B2 * | 6/2015 | Munir | B64G 1/24 |
| 2002/0004691 A1 * | 1/2002 | Kinashi | G01C 21/24 701/4 |
| 2002/0105461 A1 * | 8/2002 | Fukushima | H01Q 1/125 342/359 |
| 2002/0169578 A1 * | 11/2002 | Yang | G01S 3/36 702/152 |
| 2005/0071055 A1 * | 3/2005 | Needelman | B64G 1/361 701/13 |
| 2005/0114023 A1 * | 5/2005 | Williamson | G01C 21/165 701/472 |
| 2006/0038718 A1 * | 2/2006 | Arakane | G01C 21/165 342/357.32 |
| 2006/0118677 A1 * | 6/2006 | Goodzeit | B64G 1/1007 244/164 |
| 2006/0273958 A1 * | 12/2006 | Ivanov | G01S 3/42 342/359 |
| 2007/0057842 A1 | 3/2007 | Coleman et al. | |
| 2007/0103366 A1 * | 5/2007 | Park | G01S 3/42 342/359 |
| 2009/0089001 A1 * | 4/2009 | Lin | G01C 25/005 702/92 |
| 2009/0237303 A1 * | 9/2009 | Sohfuku | H01Q 1/1207 342/359 |
| 2010/0164425 A1 * | 7/2010 | Son | H01Q 1/27 318/648 |
| 2010/0201589 A1 * | 8/2010 | Hellberg | H01Q 1/288 343/760 |
| 2010/0211315 A1 * | 8/2010 | Toda | G01C 21/165 701/472 |
| 2016/0047675 A1 * | 2/2016 | Tanenhaus | G01C 21/16 702/104 |

OTHER PUBLICATIONS

PCT International Written Opinion, PCT/CN2014/081165, Mar. 17, 2015, 8 Pages.
Qin, Y., et al. "Kalman filtering and integrated navigation principle (second edition)," with English translation of relevant section, Northwestern Polytechnical University Press, 2012, pp. 1-391.

* cited by examiner

METHOD AND SYSTEM FOR CONTROLLING ANTENNA OF MOBILE COMMUNICATION APPLICATION SYSTEM BASED ON DOUBLE QUATERNIONS IN MEMS INERTIAL NAVIGATION

CROSS REFERENCE OF RELATED APPLICATION

The present application is a National Stage application of PCT international application PCT/CN2014/081165, filed on Jun. 30, 2014, which claims the priority to Chinese Patent Application No. 201410265808.2, entitled "METHOD AND SYSTEM FOR CONTROLLING ANTENNA OF MOBILE COMMUNICATION APPLICATION SYSTEM BASED ON DOUBLE QUATERNIONS IN MEMS INERTIAL NAVIGATION", filed on Jun. 13, 2014 with the State Intellectual Property Office of People's Republic of China, both of which are incorporated herein by reference in their entireties.

FIELD

The present invention relates to a method for controlling a satellite communication in motion antenna.

BACKGROUND

A mobile communication application system of a geostationary satellite is commonly known as "satellite communication in motion", which is an application in great need and developed rapidly in the field of satellite communication currently. In addition to advantages such as wide coverage of the satellite communication, no limitation on terrain and territory, and stable and reliable transmission line, the "satellite communication in motion" truly achieves a wideband mobile communication.

Presently, there is no mature solution of a satellite communication in motion system based on MEMS inertial navigation (which is referred to as MEMS inertial navigation) in China. With the development of the MEMS inertia technique, the accuracy of the MEMS inertial navigation is increased steadily. Presently, the satellite communication in motion system is applied more and more widely in China, and the satellite communication in motion system with low cost is urgent desired in the market. Therefore, researches on a method for controlling a satellite communication in motion antenna servo system based on MEMS inertial navigation are meaningful.

Generally, an antenna is controlled directly based on a navigation attitude quaternion obtained via strapdown inertial navigation solving. In the Kalman filtering and integrated navigation process, if an error estimation from a state estimation is great, a large current is input into a servo system instantly to drive the servo system to instantly rotate at a large angle (which is equal to the error estimation obtained by the Kalman filtering estimation), while correcting the estimation. In this case, great electrical and mechanical shocks are brought to the antenna servo system. To avoid such shocks, it takes a lot of time to wait for the Kalman filtering to become stable, and the satellite communication in motion servo system is not restarted until the servo system can tolerate the shock brought by the error correction obtained by the Kalman filtering estimation, which is against the requirement on rapid satellite aiming of the satellite communication in motion in the market.

SUMMARY

The technical problem to be solved by the invention is as follows. In order to address the conventional disadvantage, it is provided a method and a system for controlling a bi-quaternion satellite communication in motion antenna based on MEMS inertial navigation, in which a new antenna control quaternion is introduced on the basis of the conventional navigation attitude quaternion, to avoid the shock brought to the satellite communication in motion antenna servo system when the attitude error is corrected via the Kalman filtering, and significantly reduce the time for satellite aiming of the satellite communication in motion system.

A technical solution of the invention is: a method for controlling a bi-quaternion satellite communication in motion antenna based on MEMS inertial navigation is provided, which includes:

(1) mounting an MEMS inertial navigation, a GPS and a satellite communication in motion on a carrier, where the MEMS inertial navigation system and the GPS compose an integrated navigation system;

(2) setting an antenna control quaternion, where the antenna control quaternion is in a form of $[q_0{}'\ q_1{}'\ q_2{}'\ q_3{}']$, meanings of parameters of the antenna control quaternion coincide with those of a navigation attitude quaternion $[q_0\ q_1\ q_2\ q_3]$ obtained from a strapdown inertial navigation solving, and initial values of the antenna control quaternion are equal to those of the navigation attitude quaternion;

(3) in each interrupt cycle of a strapdown inertial navigation computer, updating the navigation attitude quaternion and the antenna control quaternion by using a rotation vector $\omega_{Tb}{}^b$ of a carrier coordinate system with respect to an ideal platform coordinate system;

(4) in each filtering cycle of the integrated navigation system, correcting a horizontal attitude error in a navigation attribute of the MEMS inertial navigation by using a Kalman filtering and integrated navigation algorithm, to correct the navigation attitude quaternion;

(5) in each interrupt cycle of the strapdown inertial navigation computer, obtaining an attitude angle difference by performing subtraction between a carrier attitude angle determined from the navigation attitude quaternion and a carrier attitude angle determined from the antenna control quaternion; and generating, based on the attitude angle difference, a tri-axis instruction angular velocity rotation vector for correcting the antenna control quaternion, where a. a positive correction instruction angular velocity is taken as a third element of the tri-axis instruction angular velocity rotation vector, in a case that a heading angle determined from the antenna control quaternion is greater than a heading angle determined from the navigation attitude quaternion;

b. a negative correction instruction angular velocity is taken as a third element of the tri-axis instruction angular velocity rotation vector, in a case that a heading angle determined from the antenna control quaternion is less than a heading angle determined from the navigation attitude quaternion;

c. a positive correction instruction angular velocity is taken as a first element of the tri-axis instruction angular velocity rotation vector, in a case that a pitching angle determined from the antenna control quaternion is greater than a pitching angle determined from the navigation attitude quaternion;

d. a negative correction instruction angular velocity is taken as a first element of the tri-axis instruction angular velocity rotation vector, in a case that a pitching angle determined from the antenna control quaternion is less than a pitching angle determined from the navigation attitude quaternion;

e. a positive correction instruction angular velocity is taken as a second element of the tri-axis instruction angular velocity rotation vector, in a case that a roll angle determined from the antenna control quaternion is greater than a roll angle determined from the navigation attitude quaternion;

f. a negative correction instruction angular velocity is taken as a second element of the tri-axis instruction angular velocity rotation vector, in a case that a roll angle determined from the antenna control quaternion is less than a roll angle determined from the navigation attitude quaternion; and (6) correcting the antenna control quaternion by using the tri-axis instruction angular velocity rotation vector; and in a next interrupt cycle of the strapdown inertial navigation computer after the correction, solving out a servo azimuth angle, a servo altitude angle and a servo polarizing angle of the satellite communication in motion antenna by using the corrected antenna control quaternion, and obtaining control quantities corresponding to three attitude directions to control rotation of the satellite communication in motion antenna.

GPS is configured to measure velocity and position information of a carrier and send the velocity and position information of the carrier to a filter unit in the satellite communication in motion antenna controller.

An MEMS gyroscope is configured to measure angular velocity information of the carrier in a three-dimensional space and send the angular velocity information of the carrier in the three-dimensional space to an inertial navigation solving unit and an antenna control quaternion calculation unit in the satellite communication in motion antenna controller.

An MEMS accelerometer is configured to measure specific force information of the carrier in the three-dimensional space and send the specific force information of the carrier in the three-dimensional space to the inertial navigation solving unit in the satellite communication in motion antenna controller.

The satellite communication in motion antenna controller includes the inertial navigation solving unit, the filter unit, the antenna control quaternion calculation unit, an antenna control instruction generation unit and an antenna control quaternion correction instruction angular velocity generation unit.

The inertial navigation calculation unit is configured to:
remove angular velocities due to earth rotation and motion of the carrier along earth surface from the angular velocity information of the carrier in the three-dimensional space measured by the MEMS gyroscope, to obtain a tri-axis rotation vector $\omega_{Tb}^b$ of a carrier coordinate system with respect to the geographic coordinate system;
remove a gravity acceleration and a Coriolis acceleration from the specific force information of the carrier in the three-dimensional space measured by the MEMS accelerometer, to obtain an acceleration of the carrier with respect to ground;
obtain attitude, position and velocity information of the carrier via an inertial navigation solving based on the tri-axis rotation angular velocity of the carrier coordinate system with respect to the geographic coordinate system and the acceleration of the carrier with respect to the ground, and send the attitude, position and velocity information of the carrier to the filter unit;
send, to the antenna control quaternion calculation unit, the tri-axis rotation vector $\omega_{Tb}^b$ of the carrier coordinate system with respect to the geographic coordinate system and an attitude quaternion $[q_0\ q_1\ q_2\ q_3]$ corresponding to a carrier attitude directly obtained from first inertial navigation solving; and
obtain corrected carrier attitude information from the filter unit, update the attitude quaternion corresponding to the corrected carrier attitude information by using the tri-axis rotation vector $\omega_{Tb}^b$ of the carrier coordinate system with respect to the geographic coordinate system, take the updated attitude quaternion as a navigation attitude quaternion, and send the navigation attitude quaternion to the antenna control quaternion correction instruction angular velocity generation unit.

The filter unit is configured to correct, at a fixed filter cycle, a horizontal attitude error of the carrier attitude output from the inertial navigation solving unit by using the Kalman filtering and integrated navigation algorithm based on the velocity and position information of the carrier output from the GPS and the velocity and position information of the carrier output from the inertial navigation solving unit; and send the corrected result to the inertial navigation solving unit.

The antenna control quaternion calculation unit is configured to generate an antenna control quaternion, where the antenna control quaternion is in a form of $[q_0'\ q_1'\ q_2'\ q_3']$, meanings of parameters of the antenna control quaternion coincide with those of the attitude quaternion $[q_0\ q_1\ q_2\ q_3]$ obtained by the inertial navigation solving unit, and initial values of $[q_0'\ q_1'\ q_2'\ q_3']$ are $[q_0\ q_1\ q_2\ q_3]$; update the antenna control quaternion $[q_0'\ q_1'\ q_2'\ q_3']$ by using the tri-axis rotation vector $\omega_{Tb}^b$ of the carrier coordinate system with respect to the geographic coordinate system and send the updated antenna control quaternion to the antenna control quaternion correction instruction angular velocity generation unit, every time the tri-axis rotation vector $\omega_{Tb}^b$ of the carrier coordinate system with respect to the geographic coordinate system is received from the inertial navigation solving unit; and obtain a tri-axis instruction angular velocity rotation vector from the antenna control quaternion correction instruction angular velocity generation unit, update the antenna control quaternion $[q_0'\ q_1'\ q_2'\ q_3']$ by using the tri-axis instruction angular velocity rotation vector again and send the updated antenna control quaternion to the antenna control instruction generation unit.

The antenna control quaternion correction instruction angular velocity generation unit is configured to obtain the navigation attitude quaternion and the antenna control quaternion from the inertial navigation solving unit and the antenna control quaternion calculation unit respectively; obtain an attitude angle difference by performing subtraction between a carrier attitude angle determined from the navigation attitude quaternion and a carrier attitude angle determined from the antenna control quaternion; and generate, based on the attitude angle difference, a tri-axis instruction angular velocity rotation vector for correcting the antenna control quaternion, and send the tri-axis instruction angular velocity rotation vector to the antenna control quaternion calculation unit, where values of elements in the tri-axis instruction angular velocity rotation vector are as follows:

a. a positive correction instruction angular velocity is taken as a third element of the tri-axis instruction angular velocity rotation vector, in a case that a heading angle determined from the antenna control quaternion is greater than a heading angle determined from the navigation attitude quaternion;

b. a negative correction instruction angular velocity is taken as a third element of the tri-axis instruction angular velocity rotation vector, in a case that a heading angle determined from the antenna control quaternion is less than a heading angle determined from the navigation attitude quaternion;

c. a positive correction instruction angular velocity is taken as a first element of the tri-axis instruction angular velocity rotation vector, in a case that a pitching angle determined from the antenna control quaternion is greater than a pitching angle determined from the navigation attitude quaternion;

d. a negative correction instruction angular velocity is taken as a first element of the tri-axis instruction angular velocity rotation vector, in a case that a pitching angle determined from the antenna control quaternion is less than a pitching angle determined from the navigation attitude quaternion;

e. a positive correction instruction angular velocity is taken as a second element of the tri-axis instruction angular velocity rotation vector, in a case that a roll angle determined from the antenna control quaternion is greater than a roll angle determined from the navigation attitude quaternion;

f. a negative correction instruction angular velocity is taken as a second element of the tri-axis instruction angular velocity rotation vector, in a case that a roll angle determined from the antenna control quaternion is less than a roll angle determined from the navigation attitude quaternion.

The antenna control instruction generation unit is configured to receive a newest antenna control quaternion from the antenna control quaternion calculation unit; and solve out a servo azimuth angle, a servo altitude angle and a servo polarizing angle of the satellite communication in motion antenna by using the antenna control quaternion, and send the servo azimuth angle, the servo altitude angle and the servo polarizing angle of the satellite communication in motion antenna to the satellite communication in motion antenna servo mechanism.

The satellite communication in motion antenna servo mechanism includes an azimuth-oriented motor driver and a corresponding motor, a pitch-oriented motor driver and a corresponding motor and a polarization-oriented motor driver and a corresponding motor, where the motor drivers in the three orientations drive the corresponding motors based on the servo azimuth angle, the servo altitude angle and the servo polarizing angle sent from the antenna control instruction generation unit respectively, to control rotation of three axis of the satellite communication in motion antenna.

In the cases a and b, a value of the correction instruction angular velocity is not less than a value determined by dividing a difference between the heading angle determined from the antenna control quaternion and the heading angle determined from the navigation attitude quaternion by the filtering cycle of the integrated navigation, and is not greater than a maximum allowable satellite aiming angular error per second of the satellite communication in motion antenna. In the cases c and d, a value of the correction instruction angular velocity is not less than a value determined by dividing a difference between the pitching angle determined from the antenna control quaternion and the pitching angle determined from the navigation attitude quaternion by the filtering cycle of the integrated navigation, and is not greater than the maximum allowable satellite aiming angular error per second of the satellite communication in motion antenna. In the cases e and f, a value of the correction instruction angular velocity is not less than a value determined by dividing a difference between the roll angle determined from the antenna control quaternion and the roll angle determined from the navigation attitude quaternion by the filtering cycle of the integrated navigation, and is not greater than a maximum allowable satellite aiming angular error per second of the satellite communication in motion antenna.

As compared with the conventional technology, the invention has advantages as follows.

(1) In the method according to the invention, the antenna control quaternion is introduced. The error correction of the navigation attitude quaternion by the integrated navigation algorithm causes the attitude obtained via the navigation attitude quaternion solving to hop, and such hop will bring shock to the antenna servo system. The antenna control quaternion, which is independent from the navigation attitude quaternion, blocks the antenna servo system from being oscillated which is due to the oscillation of the navigation attitude quaternion in the integrated navigation effort correction, thereby ensuring the stable operation of the antenna servo system when the inertial navigation error is corrected using the integrated navigation algorithm.

(2) In the method according to the invention, the navigation attitude quaternion is approximated at a small instruction angular velocity by using the antenna control quaternion. Initially, the antenna control quaternion may be initialized using the initial values of the navigation attitude quaternion. The antenna can be driven to finish the satellite aiming function immediately after the antenna control quaternion is initialized. The antenna control quaternion may independently control the antenna servo system to rotate smoothly after the antenna control quaternion is initialized, to block the antenna servo system from being shocked by the navigation attitude error correction, so that the antenna always aims at the satellite stably.

(3) In the system according to the invention, the inertial navigation solving unit collects the rotation angular velocity information and the acceleration information of the carrier measured by the MEMS gyroscope and the MEMS accelerometer, to achieve the inertial navigation solving. The filter unit performs error correction of the inertial navigation solving by collecting the velocity information and the position information from the GPS. The antenna control quaternion calculation unit blocks the antenna servo system from being shocked when the filter unit performs the error correction of the inertial navigation solving. The antenna control quaternion correction instruction angular velocity generation unit generates the tri-axis instruction angular velocity rotation vector for correcting the antenna control quaternion by comparing the attitude corresponding to the navigation attitude quaternion and the attitude corresponding to the antenna control quaternion. The antenna control instruction generation unit calculates the servo azimuth angle, the servo altitude angle and the servo polarizing angle required by the satellite communication in motion antenna servo system by solving the attitude corresponding to the antenna control quaternion in real-time, and controls the satellite communication in motion antenna in real-time through the satellite communication in motion antenna servo mechanism. In this way, the real time, smooth and stable control of the satellite communication in motion antenna is achieved, and the accuracy of the satellite aiming is improved.

DETAILED DESCRIPTION OF EMBODIMENTS

Figure 1:
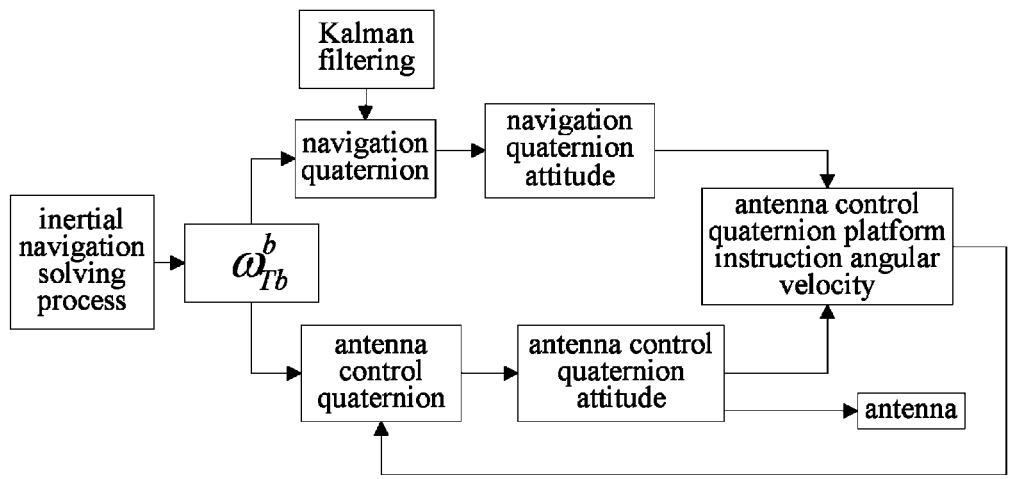
FIG. 1 is a principle block diagram of a method according to the invention.

Reference is made to FIG. 1, which is a principle block diagram of a method according to the invention. In the method according to the invention, the navigation attitude quaternion and the antenna control quaternion are cooperated to control the antenna servo system of the satellite communication in motion on the carrier.

In the method according to the invention, the concept of antenna control quaternion is introduced. The antenna control quaternion is in a form of $[q_0'\ q_1'\ q_2'\ q_3']$. Meanings of parameters of the antenna control quaternion coincide with those of the quaternion $[q_0\ q_1\ q_2\ q_3]$ obtained from the strapdown inertial navigation solving. At the beginning of the navigation, the antenna control quaternion is equal to the navigation attitude quaternion. The antenna control quaternion is updated for two times in each navigation cycle. The first updating is performed based on a rotation vector in a carrier coordinate system b with respect to an ideal platform coordinate system T, and the second updating is performed based on a constant tri-axis small instruction angular velocity. The first updating is used to track the variation in the carrier attitude, and the second updating is to cause a mathematic platform virtualized based on the antenna control quaternion to approximate to a mathematic platform virtualized based on the navigation attitude quaternion at a small angular velocity, without drastic variation of the antenna servo attitude angle due to the instant significant correction to the navigation attitude quaternion.

Both the antenna control quaternion and the navigation attitude quaternion track the carrier attitude variation using the same rotation vector updating. The antenna control quaternion is different from the navigation attitude quaternion in that, the navigation attitude quaternion corrects the estimation error using the Kalman filtering for one time when the filtering time arrives (which will shock the antenna servo system), and the antenna control quaternion approximates the navigation attitude quaternion at a small instruction angular velocity slowly (which will not shock the servo system).

Figure 2:
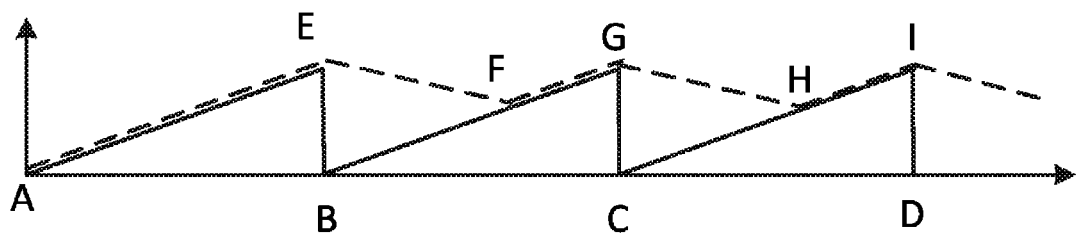
FIG. 2 is a schematic graph of variation of antenna pointing deviation with respect to variation of time.

Reference is made to FIG. 2, which is a schematic graph of variation of antenna pointing deviation with respect to variation of time. The solid line AEBGCID represents the antenna pointing error graph in a case that the rotation of the antenna is controlled by the navigation attitude quaternion. The dotted line AEFGHI represents the antenna pointing error graph in a case that the rotation of the antenna is controlled by the antenna control quaternion. AB, BC and CD represent the error correction cycle of the navigation attitude quaternion by the integrated navigation algorithm. At the point A, both the antenna control quaternion and the navigation attitude quaternion are initialized. The overlapped solid line segment AE and dotted line segment AE represent both the navigation attitude quaternion and the antenna control quaternion are updated by using the same rotation vector $\omega_{Tb}^{b}$. Since the initial value of the navigation attitude quaternion is equal to that of the antenna control quaternion, the navigation attitude quaternion is always equal to the antenna control quaternion on the line segment AB, and the solid line segment AE overlaps with the dotted line segment AE. The solid line segment EB (GC, ID) represents the navigation attitude quaternion is corrected using the integrated navigation algorithm, the navigation attitude error is returned to zero, and the antenna pointing error controlled by the navigation attitude quaternion becomes zero from a non-zero value instantly, thereby bringing vibration to the antenna servo system. The solid line segment BG (CI) represents that the antenna pointing deviation increases gradually with time and with inertial device error accumulation. The dotted line EF (GH) represents the process that the antenna control quaternion attitude approximates the navigation attitude quaternion at a small instruction angular velocity slowly. The dotted line FG (HI) represents development tendencies of the antenna pointing errors corresponding to the antenna control quaternion and the navigation attitude quaternion in a case that both the antenna control quaternion and the navigation attitude quaternion are updated using the same rotation vector after the antenna control quaternion attitude becomes equal to the navigation attitude quaternion.

The method according to the invention includes steps as follows.

(1) The initial value of the antenna control quaternion is set. The independent design of the antenna control quaternion aims to block mechanical and electrical shocks to the satellite communication in motion servo system in the carrier attitude error correction. The same as the navigation attitude quaternion, the antenna control quaternion describes the carrier attitude actually. Thus, in the startup time of the system, the antenna control quaternion is set to be equal to the navigation attitude quaternion obtained by the method of strapdown inertial navigation solving quaternion.

(2) In each interrupt cycle of a strapdown inertial navigation computer, the navigation attitude quaternion and the antenna control quaternion are updated by using a rotation vector $\omega_{Tb}^{b}$ of a carrier coordinate system with respect to an ideal platform coordinate system.

(3) In each filtering cycle, the navigation attitude quaternion, velocity and position of the MEMS inertial navigation are corrected using the Kalman filtering, to ensure the navigation accuracy of the MEMS inertial navigation for a long time.

(4) In each interrupt cycle, a difference of attitude angle is obtained by performing subtraction between a carrier attitude angle determined from the navigation attitude quaternion and a carrier attitude angle determined from the antenna control quaternion.

(5) In each interrupt cycle, the antenna control mode is determined based on the difference in the attitude angle. The basic principle is to cause the antenna control quaternion to approximate the navigation attitude quaternion. Here, a tri-axis instruction angular velocity rotation vector for correcting the antenna control quaternion is introduced. Specifically, there are following cases.

a. A positive correction instruction angular velocity is taken as a third element of the tri-axis instruction angular velocity rotation vector, in a case that a heading angle determined from the antenna control quaternion is greater than a heading angle determined from the navigation attitude quaternion.

b. A negative correction instruction angular velocity is taken as a third element of the tri-axis instruction angular velocity rotation vector, in a case that a heading angle determined from the antenna control quaternion is less than a heading angle determined from the navigation attitude quaternion.

The value of the correction instruction angular velocity is set as follows. To minimize the shock on the antenna servo system due to the correction of the antenna control quaternion, the correction instruction angular velocity of the third element of the tri-axis instruction angular velocity rotation vector is a value obtained by dividing the difference between the heading angle of the antenna control quaternion and the heading angle of the navigation attitude quaternion by the filtering cycle of the integrated navigation. In the case that the instruction angular velocity is a value obtained by dividing the difference between the heading angle of the antenna control quaternion and the heading angle of the navigation attitude quaternion by the filtering cycle of the integrated navigation, the maximum of the heading angle error of the antenna control quaternion is equal to the maximum of the heading angle error of the navigation attitude quaternion. Considering undetermined factors in the operation of the system, the instruction angular velocity should be greater than the value obtained by dividing the difference between the heading angle of the antenna control quaternion and the heading angle of the navigation attitude quaternion by the filtering cycle of the integrated navigation, and the maximum value of the instruction angular velocity should not be greater than a maximum allowable satellite aiming angular error of the satellite communication in motion antenna per second.

c. A positive correction instruction angular velocity is taken as a first element of the tri-axis instruction angular velocity rotation vector, in a case that a pitching angle determined from the antenna control quaternion is greater than a pitching angle determined from the navigation attitude quaternion.

d. A negative correction instruction angular velocity is taken as a first element of the tri-axis instruction angular velocity rotation vector, in a case that a pitching angle determined from the antenna control quaternion is less than a pitching angle determined from the navigation attitude quaternion.

In the above two cases, the value of the correction instruction angular velocity is set using the same method as that in cases a and d, and the difference lies in that the two cases refer to the first element, which corresponds to the pitching angle, thus it only needs to calculate by replacing the heading angle in cases a and b with the pitching angle.

e. A positive correction instruction angular velocity is taken as a second element of the tri-axis instruction angular velocity rotation vector, in a case that a roll angle determined from the antenna control quaternion is greater than a roll angle determined from the navigation attitude quaternion.

f. A negative correction instruction angular velocity is taken as a second element of the tri-axis instruction angular velocity rotation vector, in a case that a roll angle determined from the antenna control quaternion is less than a roll angle determined from the navigation attitude quaternion.

In the above two cases, the value of the correction instruction angular velocity is set using the same method as that in cases a and d, and the difference lies in that the two cases refer to the second element, which corresponds to the roll angle, thus it only needs to calculate by replacing the heading angle in cases a and b with the roll angle.

(6) A servo azimuth angle, a servo altitude angle and a servo polarizing angle of the satellite communication in motion antenna are calculated based on the attitude angle corresponding to the antenna control quaternion, to drive the satellite communication in motion servo system to control the antenna.

Figure 3:
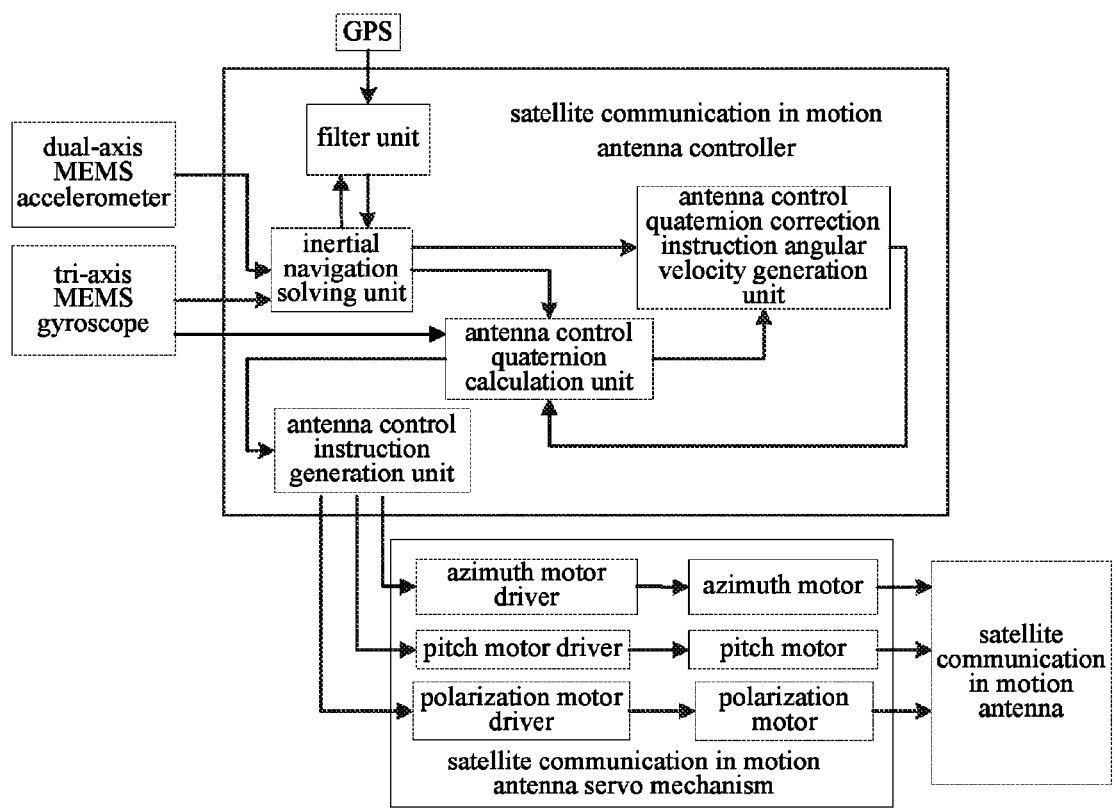
FIG. 3 is a principle block diagram of composing of a system according to the invention.

Reference is made to FIG. 3, which is a principle diagram of composing of a system for controlling a bi-quaternion satellite communication in motion antenna based on MEMS inertial navigation according to the invention. The system includes a satellite communication in motion antenna controller, a GPS, an MEMS gyroscope, an MEMS accelerometer and a satellite communication in motion antenna servo mechanism.

The GPS is mainly configured to measure velocity and position information of a carrier and send the velocity and position information of the carrier to a filter unit in the satellite communication in motion antenna controller.

The MEMS gyroscope is mainly configured to measure angular velocity information of the carrier in a three-dimensional space and send the angular velocity information of the carrier in the three-dimensional space to an inertial navigation solving unit and an antenna control quaternion calculation unit in the satellite communication in motion antenna controller.

The MEMS accelerometer is mainly configured to measure specific force information of the carrier in the three-dimensional space and send the specific force information of the carrier in the three-dimensional space to the inertial navigation solving unit in the satellite communication in motion antenna controller.

The satellite communication in motion antenna servo mechanism includes an azimuth-oriented motor driver and a corresponding motor, a pitch-oriented motor driver and a corresponding motor and a polarization-oriented motor driver and a corresponding motor, wherein the motor drivers in the three orientations drive the corresponding motors based on the servo azimuth angle, the servo altitude angle and the servo polarizing angle sent from the antenna control instruction generation unit respectively, to control rotation of three axis of the satellite communication in motion antenna.

The satellite communication in motion antenna controller is the core of the system according to the invention, which mainly includes the inertial navigation solving unit, the filter unit, the antenna control quaternion calculation unit, an antenna control instruction generation unit and an antenna control quaternion correction instruction angular velocity generation unit.

The inertial navigation solving unit is configured to remove angular velocities due to earth rotation and motion of the carrier along earth surface from the angular velocity information of the carrier in the three-dimensional space measured by the MEMS gyroscope, to obtain a tri-axis rotation vector $\omega_{Tb}^b$ of a carrier coordinate system with respect to the geographic coordinate system; remove a gravity acceleration and a Coriolis acceleration from the specific force information of the carrier in the three-dimensional space measured by the MEMS accelerometer, to obtain an acceleration of the carrier with respect to ground; obtain attitude, position and velocity information of the carrier via an inertial navigation solving based on the tri-axis rotation angular velocity of the carrier coordinate system with respect to the geographic coordinate system and the acceleration of the carrier with respect to the ground, and send the attitude, position and velocity information of the carrier to the filter unit; send, to the antenna control quaternion calculation unit, the tri-axis rotation vector $\omega_{Tb}^b$ of the carrier coordinate system with respect to the geographic coordinate system and an attitude quaternion $[q_0\ q_1\ q_2\ q_3]$ corresponding to a carrier attitude directly obtained from first inertial navigation solving; and obtain corrected carrier attitude information from the filter unit, update the attitude quaternion corresponding to the corrected carrier attitude information by using the tri-axis rotation vector $\omega_{Tb}^b$ of the carrier coordinate system with respect to the geographic coordinate system, take the updated attitude quaternion as a navigation attitude quaternion, and send the navigation attitude quaternion to the antenna control quaternion correction instruction angular velocity generation unit.

The filter unit is configured to combine the velocity and position information of the carrier output from the GPS and the velocity and position information of the carrier output from the inertial navigation solving unit; calculate differences between the east velocity and the north velocity of the carrier obtained by the GPS and the east velocity and the north velocity of the carrier output from the inertial navigation solving unit respectively; take the two differences as a measurement quantity of the Kalman filtering; and correct, at a fixed filter cycle, the carrier attitude information output from the inertial navigation solving unit by using the Kalman filtering and integrated navigation algorithm and send the corrected result to the inertial navigation solving unit. For the Kalman filtering and integrated navigation algorithm, reference may be made to "Kalman filtering and integrated navigation principle (second edition)", Qin, Yongyuan, Zhang Hongyue and Wang Shuhua, Northwestern Polytechnical University Press, 2012. In the invention, eight quantities, including the east and north velocity errors, the east and north misalignment angles, the right and forward gyro-drifts and the right and forward accelerometer offsets, are selected as the state variables.

The antenna control quaternion calculation unit is configured to generate an antenna control quaternion, wherein the antenna control quaternion is in a form of $[q_0'\ q_1'\ q_2'\ q_3']$, meanings of parameters of the antenna control quaternion coincide with those of the attitude quaternion $[q_0\ q_1\ q_2\ q_3]$ obtained by the inertial navigation solving unit, and initial values of $[q_0'\ q_1'\ q_2'\ q_3']$ are $[q_0\ q_1\ q_2\ q_3]$; update the antenna control quaternion $[q_0'\ q_1'\ q_2'\ q_3']$ by using the tri-axis rotation vector $\omega_{Tb}^b$ of the carrier coordinate system with respect to the geographic coordinate system and send the updated antenna control quaternion to the antenna control quaternion correction instruction angular velocity generation unit, every time the tri-axis rotation vector $\omega_{Tb}^b$ of the carrier coordinate system with respect to the geographic coordinate system is received from the inertial navigation solving unit; and obtain a tri-axis instruction angular velocity rotation vector from the antenna control quaternion correction instruction angular velocity generation unit, update the antenna control quaternion $[q_0'\ q_1'\ q_2'\ q_3']$ by using the tri-axis instruction angular velocity rotation vector again and send the updated antenna control quaternion to the antenna control instruction generation unit.

The antenna control quaternion correction instruction angular velocity generation unit is configured to obtain the navigation attitude quaternion and the antenna control quaternion from the inertial navigation solving unit and the antenna control quaternion calculation unit respectively; obtain an attitude angle difference by performing subtraction between a carrier attitude angle determined from the navigation attitude quaternion and a carrier attitude angle determined from the antenna control quaternion; and generate, based on the attitude angle difference, a tri-axis instruction angular velocity rotation vector for correcting the antenna control quaternion, and send the tri-axis instruction angular velocity rotation vector to the antenna control quaternion calculation unit.

The antenna control instruction generation unit is configured to receive a newest antenna control quaternion from the antenna control quaternion calculation unit; and calculate a servo azimuth angle, a servo altitude angle and a servo polarizing angle of the satellite communication in motion antenna by using the antenna control quaternion, and send the servo azimuth angle, the servo altitude angle and the servo polarizing angle of the satellite communication in motion antenna to the satellite communication in motion antenna servo mechanism.

The inertial navigation solving unit operates by mainly using the strapdown inertial navigation algorithm. In the strapdown inertial navigation algorithm, attitude solving, velocity solving and position solving are performed. A mathematical carrier of the attitude information is the navigation attitude quaternion. The navigation attitude quaternion is a reference quantity for variation of the antenna control quaternion. The velocity information is used to consist, together with the velocity information obtained by the GPS, the filter measurement quantity of the filter unit. The servo azimuth angle, the servo altitude angle and the servo polarizing angle of the satellite communication in motion antenna are calculated based on the position information and the attitude information corresponding to the antenna control quaternion.

The servo azimuth angle, the servo altitude angle and the servo polarizing angle are calculated as follows.

The navigation coordinate system n, the carrier coordinate system b, the antenna coordinate system v and the earth coordinate system e are involved in the calculation. The geographic coordinate system (x-east, y-north, z-sky) is taken as the navigation coordinate system n. The x-axis, the y-axis and the z-axis of the carrier coordinate system direct to the right, the front and the top of the carrier respectively. In the antenna coordinate system v, the y-axis is consistent with the direction of the antenna, the z-axis directs upwards along the azimuth axis of the antenna, and the x-axis together with the other two axes form the right-handed system. In the earth coordinate system e, the origin is located at the core of the earth, the x-axis is across the intersection between the prime meridian and the equator, the z-axis is across the North Pole of the earth, and the y-axis is across the intersection between the meridian east longitude ninety degrees and the equator. The earth coordinate system e is earth-fixed.

Based on the above definitions of the coordinate systems, conversion matrixes between respective coordinate systems can be calculated conveniently. The conversion matrix for converting the antenna coordinate system to the carrier coordinate system is $C_v^b$. The conversion matrix for converting the carrier coordinate system to the navigation coordinate system is $C_b^n$. The conversion matrix for converting the navigation coordinate system to the carrier coordinate system is $C_n^b$. The conversion matrix for converting the antenna coordinate system to the navigation coordinate system is $C_v^n$. The conversion matrix for converting the earth coordinate system to the navigation coordinate system is $C_e^n$.

For the antenna servo azimuth angle and servo altitude angle, the coordinates $(X_s^e\ Y_s^e\ Z_s^e)$ of the satellite in the earth rectangular coordinate system may be obtained based on the satellite longitude $\lambda_s$, and the coordinates $(X_b^e\ Y_b^e\ Y_b^e)$ of the carrier in the earth rectangular coordinate system may also be easily obtained, then the vector from the carrier to the satellite is:

$$R_{bs}^e = \begin{bmatrix} X_s^e \\ Y_s^e \\ Z_s^e \end{bmatrix} - \begin{bmatrix} X_b^e \\ Y_b^e \\ Z_b^e \end{bmatrix},$$

where $$\begin{bmatrix} X_s^e \\ Y_s^e \\ Z_s^e \end{bmatrix} = \begin{bmatrix} R \cdot \cos\lambda_s \\ R \cdot \sin\lambda_s \\ 0 \end{bmatrix}, \begin{bmatrix} X_b^e \\ Y_b^e \\ Z_b^e \end{bmatrix} = \begin{bmatrix} R_e \cdot \cos L \cdot \sin\lambda \\ R_e \cdot \cos L \cdot \cos\lambda \\ R_e \cdot \sin L \end{bmatrix},$$

R is a geosynchronous orbit radius, L is a latitude where the carrier is located, $\lambda$ is a longitude where the carrier is located, and $R_e$ is a radius of the earth.

Coordinates of the vector $R_{bs}^e$ is converted into the carrier coordinate system b, that is, $$R_{bs}^b = C_n^b \cdot C_e^n \cdot R_{bs}^e.$$

From the above equation, the antenna servo altitude angle is $$\theta_{pit} = \tan^{-1}\left( \frac{Z_{R_{bs}^b}}{\sqrt{X_{R_{bs}^b}^2 + Y_{R_{bs}^b}^2}} \right).$$

The principal value of the antenna servo azimuth angle is $$\theta_{cour} = \tan^{-1}\left( \frac{X_{R_{bs}^b}}{Y_{R_{bs}^b}} \right),$$

where $X_{R_{bs}^b}$, $Y_{R_{bs}^b}$, and $Z_{R_{bs}^b}$ are three components of the vector $R_{bs}^b$.

The antenna servo polarizing angle is $$\theta_{roll} = \tan^{-1}\left( \frac{\sin(\lambda_{sat} - \lambda_{loca})}{\tan(L_{loca})} \right),$$

where $\lambda_{loca}$ is the longitude where the carrier is located, $\lambda_{sat}$ is the longitude where the satellite is located, and $L_{loca}$ is the latitude where the carrier is located The content that is not described in detail in the specification of the invention is known technology of those skilled in the art.

The invention claimed is:

1. A method for controlling a bi-quaternion satellite communication in motion antenna based on MEMS inertial navigation, comprising:
   (1) mounting an MEMS inertial navigation, a GPS and a satellite communication in motion on a carrier, wherein the MEMS inertial navigation and the GPS compose an integrated navigation system;
   (2) setting an antenna control quaternion, wherein the antenna control quaternion is in a form of $[q_0' \; q_1' \; q_2' \; q_3']$, meanings of parameters of the antenna control quaternion coincide with those of a navigation attitude quaternion $[q_0 \; q_1 \; q_2 \; q_3]$ obtained from a strapdown inertial navigation solving, and initial values of the antenna control quaternion are equal to those of the navigation attitude quaternion;
   (3) in each interrupt cycle of a strapdown inertial navigation computer, updating the navigation attitude quaternion and the antenna control quaternion by using a rotation vector $\omega_{Tb}^b$ of a carrier coordinate system with respect to an ideal platform coordinate system;
   (4) in each filtering cycle of the integrated navigation system, correcting a horizontal attitude error in a navigation attribute of the MEMS inertial navigation by using a Kalman filtering and integrated navigation algorithm, to correct the navigation attitude quaternion;
   (5) in each interrupt cycle of the strapdown inertial navigation computer, obtaining an attitude angle difference by performing subtraction between a carrier attitude angle determined from the navigation attitude quaternion and a carrier attitude angle determined from the antenna control quaternion; and generating, based on the attitude angle difference, a tri-axis instruction angular velocity rotation vector for correcting the antenna control quaternion, wherein
      a. a positive correction instruction angular velocity is taken as a third element of the tri-axis instruction angular velocity rotation vector, in a case that a heading angle determined from the antenna control quaternion is greater than a heading angle determined from the navigation attitude quaternion;
      b. a negative correction instruction angular velocity is taken as a third element of the tri-axis instruction angular velocity rotation vector, in a case that a heading angle determined from the antenna control quaternion is less than a heading angle determined from the navigation attitude quaternion;
      c. a positive correction instruction angular velocity is taken as a first element of the tri-axis instruction angular velocity rotation vector, in a case that a pitching angle determined from the antenna control quaternion is greater than a pitching angle determined from the navigation attitude quaternion;
      d. a negative correction instruction angular velocity is taken as a first element of the tri-axis instruction angular velocity rotation vector, in a case that a pitching angle determined from the antenna control quaternion is less than a pitching angle determined from the navigation attitude quaternion;
      e. a positive correction instruction angular velocity is taken as a second element of the tri-axis instruction angular velocity rotation vector, in a case that a roll angle determined from the antenna control quaternion is greater than a roll angle determined from the navigation attitude quaternion;
      f. a negative correction instruction angular velocity is taken as a second element of the tri-axis instruction angular velocity rotation vector, in a case that a roll angle determined from the antenna control quaternion is less than a roll angle determined from the navigation attitude quaternion; and
   (6) correcting the antenna control quaternion by using the tri-axis instruction angular velocity rotation vector; and in a next interrupt cycle of the strapdown inertial navigation computer after the correction, solving out a servo azimuth angle, a servo altitude angle and a servo polarizing angle of the satellite communication in motion antenna by using the corrected antenna control quaternion, and obtaining control quantities corresponding to the three attitude directions to control rotation of the satellite communication in motion antenna.

2. The method for controlling the bi-quaternion satellite communication in motion antenna based on MEMS inertial navigation according to claim 1, wherein
   in the cases a and b, a value of the correction instruction angular velocity in step (5) is not less than a value determined by dividing a difference between the heading angle determined from the antenna control quaternion and the heading angle determined from the navigation attitude quaternion by the filtering cycle of the integrated navigation, and is not greater than a maximum allowable satellite aiming angular error per second of the satellite communication in motion antenna;

in the cases c and d, the value of the correction instruction angular velocity in step (5) is not less than a value determined by dividing a difference between the pitching angle determined form the antenna control quaternion and the pitching angle determined from the navigation attitude quaternion by the filtering cycle of the integrated navigation, and is not greater than the maximum allowable satellite aiming angular error per second of the satellite communication in motion antenna; and in the cases e and f, the value of the correction instruction angular velocity in step (5) is not less than a value determined by dividing a difference between the roll angle determined from the antenna control quaternion and the roll angle determined from the navigation attitude quaternion by the filtering cycle of the integrated navigation, and is not greater than the maximum allowable satellite aiming angular error per second of the satellite communication in motion antenna.

3. A system for controlling a bi-quaternion satellite communication in motion antenna based on MEMS inertial navigation, comprising a satellite communication in motion antenna controller, a GPS, an MEMS gyroscope, an MEMS accelerometer and a satellite communication in motion antenna servo mechanism, wherein the GPS is configured to measure velocity and position information of a carrier and send the velocity and position information of the carrier to a filter unit in the satellite communication in motion antenna controller;

the MEMS gyroscope is configured to measure angular velocity information of the carrier in a three-dimensional space and send the angular velocity information of the carrier in the three-dimensional space to an inertial navigation solving unit and an antenna control quaternion calculation unit in the satellite communication in motion antenna controller;

the MEMS accelerometer is configured to measure specific force information of the carrier in the three-dimensional space and send the specific force information of the carrier in the three-dimensional space to the inertial navigation solving unit in the satellite communication in motion antenna controller;

the satellite communication in motion antenna controller comprises the inertial navigation solving unit, the filter unit, the antenna control quaternion calculation unit, an antenna control instruction generation unit and an antenna control quaternion correction instruction angular velocity generation unit, wherein the inertial navigation solving unit is configured to remove angular velocities due to earth rotation and motion of the carrier along earth surface from the angular velocity information of the carrier in the three-dimensional space measured by the MEMS gyroscope, to obtain a tri-axis rotation vector $\omega_{Tb}^{b}$ of a carrier coordinate system with respect to the geographic coordinate system;

remove a gravity acceleration and a Coriolis acceleration from the specific force information of the carrier in the three-dimensional space measured by the MEMS accelerometer, to obtain an acceleration of the carrier with respect to ground;

obtain attitude, position and velocity information of the carrier via an inertial navigation solving based on the tri-axis rotation angular velocity of the carrier coordinate system with respect to the geographic coordinate system and the acceleration of the carrier with respect to the ground, and send the attitude, position and velocity information of the carrier to the filter unit;

send, to the antenna control quaternion calculation unit, the tri-axis rotation vector $\omega_{Tb}^{b}$ of the carrier coordinate system with respect to the geographic coordinate system and an attitude quaternion $[q_0\ q_1\ q_2\ q_3]$ corresponding to a carrier attitude directly obtained from first inertial navigation solving; and obtain corrected carrier attitude information from the filter unit, update the attitude quaternion corresponding to the corrected carrier attitude information by using the tri-axis rotation vector $\omega_{Tb}^{b}$ of the carrier coordinate system with respect to the geographic coordinate system, take the updated attitude quaternion as a navigation attitude quaternion, and send the navigation attitude quaternion to the antenna control quaternion correction instruction angular velocity generation unit;

the filter unit is configured to correct, at a fixed filter cycle, a horizontal attitude error in the carrier attitude output from the inertial navigation solving unit by using the Kalman filtering and integrated navigation algorithm based on the velocity and position information of the carrier output from the GPS and the velocity and position information of the carrier output from the inertial navigation solving unit; and send the corrected result to the inertial navigation solving unit;

the antenna control quaternion calculation unit is configured to generate an antenna control quaternion, wherein the antenna control quaternion is in a form of $[q_0'\ q_1'\ q_2'\ q_3']$, meanings of parameters of the antenna control quaternion coincide with those of the attitude quaternion $[q_0\ q_1\ q_2\ q_3]$ obtained by the inertial navigation solving unit, and initial values of $[q_0'\ q_1'\ q_2'\ q_3']$ are $[q_0\ q_1\ q_2\ q_3]$; update the antenna control quaternion $[q_0'\ q_1'\ q_2'\ q_3']$ by using the tri-axis rotation vector $\omega_{Tb}^{b}$ of the carrier coordinate system with respect to the geographic coordinate system and send the updated antenna control quaternion to the antenna control quaternion correction instruction angular velocity generation unit, every time the tri-axis rotation vector $\omega_{Tb}^{b}$ of the carrier coordinate system with respect to the geographic coordinate system is received from the inertial navigation solving unit; and obtain a tri-axis instruction angular velocity rotation vector from the antenna control quaternion correction instruction angular velocity generation unit, update the antenna control quaternion $[q_0'\ q_1'\ q_2'\ q_3']$ by using the tri-axis instruction angular velocity rotation vector again and send the updated antenna control quaternion to the antenna control instruction generation unit;

the antenna control quaternion correction instruction angular velocity generation unit is configured to obtain the navigation attitude quaternion and the antenna control quaternion from the inertial navigation solving unit and the antenna control quaternion calculation unit respectively; obtain an attitude angle difference by performing subtraction between a carrier attitude angle determined from the navigation attitude quaternion and a carrier attitude angle determined from the antenna control quaternion; and generate, based on the attitude angle difference, a tri-axis instruction angular velocity rotation vector for correcting the antenna control quaternion, and send the tri-axis instruction angular velocity rotation vector to the antenna control quaternion calculation unit, wherein values of elements in the tri-axis instruction angular velocity rotation vector are as follows:
  a. a positive correction instruction angular velocity is taken as a third element of the tri-axis instruction angular velocity rotation vector, in a case that a heading angle determined from the antenna control quaternion is greater than a heading angle determined from the navigation attitude quaternion;
  b. a negative correction instruction angular velocity is taken as a third element of the tri-axis instruction angular velocity rotation vector, in a case that a heading angle determined from the antenna control quaternion is less than a heading angle determined from the navigation attitude quaternion;
  c. a positive correction instruction angular velocity is taken as a first element of the tri-axis instruction angular velocity rotation vector, in a case that a pitching angle determined from the antenna control quaternion is greater than a pitching angle determined from the navigation attitude quaternion;
  d. a negative correction instruction angular velocity is taken as a first element of the tri-axis instruction angular velocity rotation vector, in a case that a pitching angle determined from the antenna control quaternion is less than a pitching angle determined from the navigation attitude quaternion;
  e. a positive correction instruction angular velocity is taken as a second element of the tri-axis instruction angular velocity rotation vector, in a case that a roll angle determined from the antenna control quaternion is greater than a roll angle determined from the navigation attitude quaternion;
  f. a negative correction instruction angular velocity is taken as a second element of the tri-axis instruction angular velocity rotation vector, in a case that a roll angle determined from the antenna control quaternion is less than a roll angle determined from the navigation attitude quaternion;

the antenna control instruction generation unit is configured to receive a newest antenna control quaternion from the antenna control quaternion calculation unit; and solve out a servo azimuth angle, a servo altitude angle and a servo polarizing angle of the satellite communication in motion antenna by using the antenna control quaternion, and send the servo azimuth angle, the servo altitude angle and the servo polarizing angle of the satellite communication in motion antenna to the satellite communication in motion antenna servo mechanism;

the satellite communication in motion antenna servo mechanism comprises an azimuth-oriented motor driver and a corresponding motor, a pitch-oriented motor driver and a corresponding motor and a polarization-oriented motor driver and a corresponding motor, wherein the motor drivers in the three orientations drive the corresponding motors based on the servo azimuth angle, the servo altitude angle and the servo polarizing angle sent from the antenna control instruction generation unit respectively, to control rotation of three axis of the satellite communication in motion antenna.

4. The system for controlling the bi-quaternion satellite communication in motion antenna based on MEMS inertial navigation according to claim 3, wherein in the cases a and b, a value of the correction instruction angular velocity generated by the antenna control quaternion correction instruction angular velocity generation unit is not less than a value determined by dividing a difference between the heading angle determined from the antenna control quaternion and the heading angle determined from the navigation attitude quaternion by the filtering cycle of the integrated navigation, and is not greater than a maximum allowable satellite aiming angular error per second of the satellite communication in motion antenna;

in the cases c and d, a value of the correction instruction angular velocity generated by the antenna control quaternion correction instruction angular velocity generation unit is not less than a value determined by dividing a difference between the pitching angle determined from the antenna control quaternion and the pitching angle determined from the navigation attitude quaternion by the filtering cycle of the integrated navigation, and is not greater than the maximum allowable satellite aiming angular error per second of the satellite communication in motion antenna; and in the cases e and f, a value of the correction instruction angular velocity generated by the antenna control quaternion correction instruction angular velocity generation unit is not less than a value determined by dividing a difference between the roll angle determined from the antenna control quaternion and the roll angle determined from the navigation attitude quaternion by the filtering cycle of the integrated navigation, and is not greater than a maximum allowable satellite aiming angular error per second of the satellite communication in motion antenna.

* * * * *